Nov. 29, 1966  C. V. GARY  3,288,162
CHARGING AND SAMPLING VALVE IN A CLOSED FLUID SYSTEM
Filed Feb. 20, 1964  2 Sheets-Sheet 2

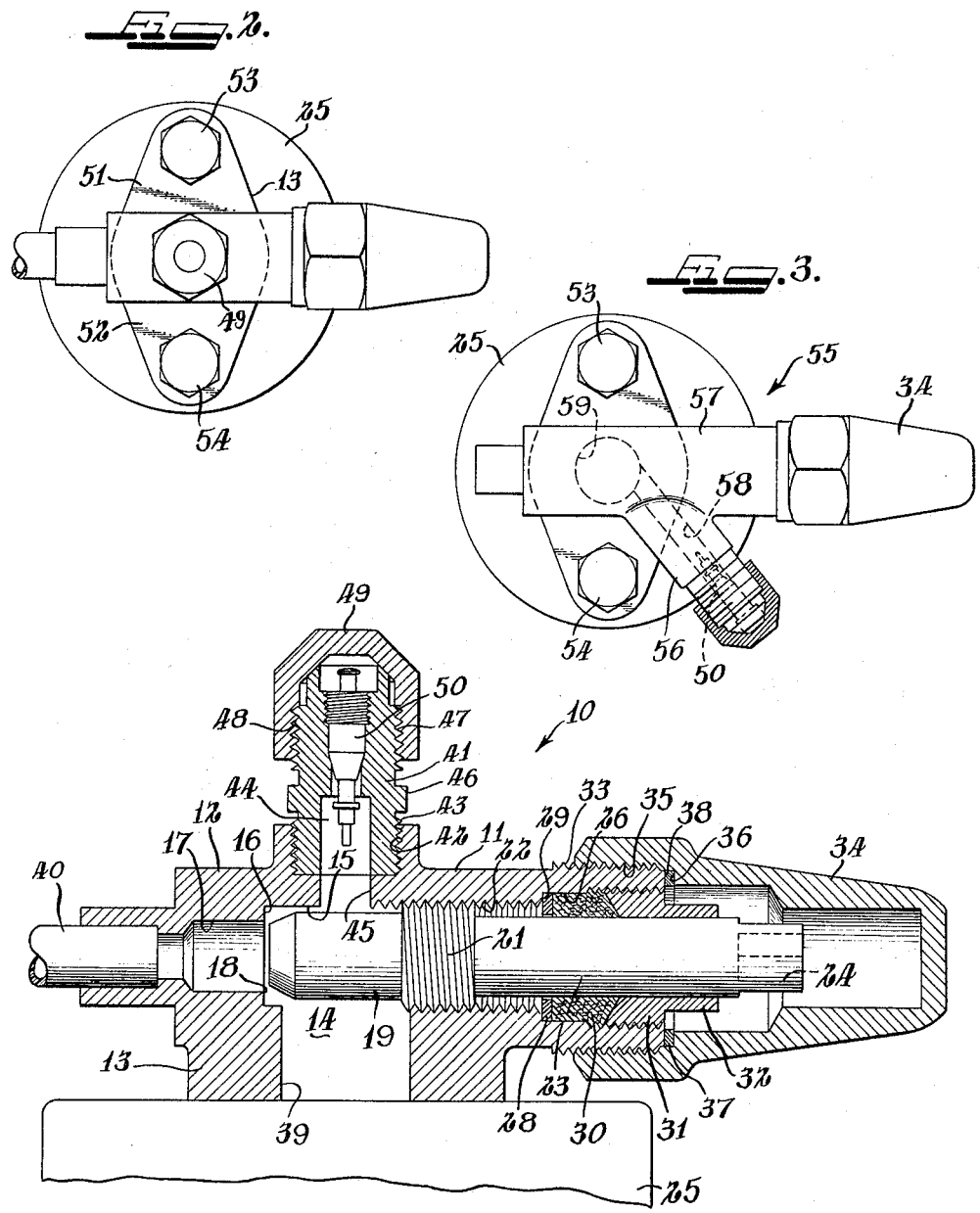

INVENTOR.
CHARLES V. GARY
BY
Greist, Lockwood, Greenawalt & Dewey
Attys.

United States Patent Office 3,288,162
Patented Nov. 29, 1966

3,288,162
CHARGING AND SAMPLING VALVE IN A CLOSED FLUID SYSTEM
Charles V. Gary, Elmhurst, Ill., assignor to Henry Valve Company, Melrose Park, Ill., a corporation of Illinois
Filed Feb. 20, 1964, Ser. No. 346,273
3 Claims. (Cl. 137—223)

This invention relates to valves in general and more specifically is directed towards novel charging valve arrangements particularly adapted for use in refrigeration and like forms of closed fluid systems.

In the past, various types of closed fluid systems have been provided with different types of apparatus to permit the introduction of additional fluid or sampling of the fluid within the closed system. This is generally necessary in order to maintain the volume and pressure of the fluid at an efficient operating level. Some of the earlier types of apparatus to accomplish this operation were rather crude utilizing a pinch-off line usually formed of soft copper or the like. Fluid would be introduced or sampled and thereafter the line would be squeezed shut and soldered to reclose the system. Later, more sophisticated apparatus was introduced to accomplish this result, which represented a rather substantial advance over their crude predecessors.

One of the more popular forms of apparatus to tap closed systems included a back seating valve having an external fitting adjacent the valve stem permitting connection to a system externally of the closed system. In normal periods of operation the external fitting would be capped to maintain the system closed. Connection to the closed system was accomplished by moving the valve stem to the fully opened position to back seat and thereby isolate the external fitting from the closed system. With the valve stem fully opened, the fluid tight cover or cap could be removed from the external fitting and a gauge, sampling, or charging line could then be connected. The valve stem would then be moved towards the closed position to place the external line in communication with the closed system.

One disadvantage in using this type of apparatus was the requirement for the valve to be of a back seating type. Back seating valves, comparatively speaking, are rather expensive to manufacture and therefore desirable to eliminate from the system if possible. In addition, if the valve stem is to be operated to a fully opened position each time charging or sampling is accomplished, the attendant wear on the valve stem packing raises the possibility of leaks requiring the entire system to be drained to replace or repair the same. In summary, this form of valve while performing satisfactorily was expensive to construct and left something to be desired when the over-all efficiency of the charging and sampling operation was compared with a system utilizing the novel valve of the present invention. In addition, the possibility always existed that the external fitting cap might be accidentally removed without the valve being back seated, resulting in the closed system being vented to atmosphere. Where the fluid in the closed system was ammonia, Freon or the like, this arrangement was obviously undesirable from the safety standpoint.

In an effort to provide a simplified form of charging valve of uncomplicated and inexpensive design, the present invention was conceived. A charging valve design was developed which served to make the charging and sampling operation exceedingly efficient. Substantial benefits are derived from the use of the present valve construction in the form of reducing the time required for accomplishment of the charging and sampling operation. A severe reduction in the over-all cost of the charging valve was experienced without sacrificing the desired high performance characteristics. Varied other benefits were presented upon the implementation of the present valve construction in closed systems in addition to those enumerated above. With the present valve construction, selective sampling and charging can be accomplished with ease. Also, the pressure of the compressor and/or system under operating conditions can easily be determined, as well as enabling other pressure checks to be made which will alert the operator to the need for preventative maintenance well in advance of total compressor failure. In addition, the entire pressure of the system under static conditions can be readily ascertained, and fluid may be added to or removed from the closed system with unequaled ease.

A more comprehensive understanding of the present invention and the attendant advantages derived from its implementation into closed fluid systems will be had upon a perusal of the more prominent objects to be achieved and the detailed description of the device to follow.

It is therefore an object of this invention to provide a new and improved form of charging and sampling valve of uncomplicated design.

It is a further object of this invention to provide a charging and sampling valve particularly adapted to be used in closed systems such as refrigeration systems and the like.

It is a further object of this invention to provide a charging valve of simplified construction forming a part of a closed system which permits selective sampling of one portion of the system independently of another portion of the system.

It is a further object of this invention to provide a new and improved charging valve adapted to be connected in a closed system and having charging core means associated therewith for providing automatic communication between the closed system and an external system upon joining of said external system to said charging valve.

It is a further object of this invention to provide a new and improved charging valve which permits charging and sampling of the closed system of which the charging valve is a part without requiring operation of the valve stem in the charging valve.

It is a further object of this invention to provide a new and improved valve construction of simplified design having means thereon to permit communication with the valve chamber irrespective of the position of the valve stem mounted in the charging valve.

It is a still further object of this invention to provide a new and improved valve having cap means to fluid-tightly cap off the protruding end of the operating valve stem and an external charging fitting.

Further and fuller objects will become readily apparent when reference is made to the accompanying drawings wherein:

FIG. 1 is an enlarged cross sectional view of the charging valve of the present invention mounted in a closed system with a compressor head and outlet line being shown fragmentarily;

FIG. 2 is a top plan view on a reduced scale of the valve of FIG. 1;

FIG. 3 is a top plan view similar to FIG. 2 of a modified form of valve with the charging fitting in a different location;

Figure 4:
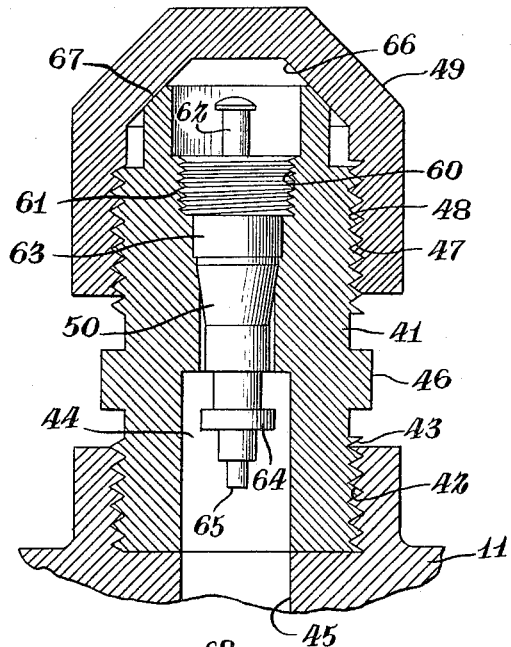
FIG. 4 is an enlarged cross sectional view of the charging fitting arrangement.

Referring now to FIG. 1, reference numeral 10 indicates the charging and sampling valve of the present invention. The valve 10 includes a valve body 11 mounted in a closed system as discussed briefly above. The valve body 11 includes a generally cylindrical body forming portion 12 having an integral flat base portion 13 adapted to be mounted on a compressor shown fragmentarily at 25. A central chamber is formed in the valve body 11 by successively stepped cylindrical bores to accommodate the working parts of the valve. An enlarged cylindrical bore 15 forms a part of the chamber 14 and terminates in a radially extending shoulder or end wall 16 which intersects a cylindrical bore 17 of reduced diameter. A valve seat is formed by the intersection as indicated at 18 and may be a sharp seating surface or an apical zone depending upon the desired requirements.

A valve stem 19 is received within the chamber 14 and terminates in a frusto-conical end portion 20 forming a stem seat to co-operate with the valve body seat 18. The central portion 21 of the valve stem 19 is externally threaded with fine pitched threads to co-operate with complementary internal threads 22 formed in the valve body 11. The valve stem 19 has an outer end portion 23 of reduced diameter which extends outwardly of the valve body 11. The outer end portion 23 of the valve stem 19 may be formed with internal tool pads 24 to accommodate an Allen-head wrench or similar wrench to provide a handle to rotate the valve stem 19 between the open and closed positions. Obviously, external tool pads for engagement by a wrench, valve handle or the like may be provided in lieu of or in addition to the internal tool pads 24.

An annular bore 26 of the increased diameter surrounds a circumferential portion of the outer end 23 of the valve stem 19 to form a packing chamber 26. The outer end of the packing chamber 26 is internally threaded with the threads stopping short of a shoulder 29 forming an annular inner end wall in the packing chamber 26. A packing retainer washer 28 abuts the shoulder 29 to prevent extrusion of the packing material 30 into the threaded portion 22 which could foul the smooth operation of the valve stem.

An externally threaded follower 31 is received within the packing chamber 26 and is adjustable to control the compression on the packing material 30 to compensate for wear. A polygonal wrench engaging portion 32 is formed on the outer end of the follower 31 to permit adjustment to be accomplished with minimum effort.

The valve body 11 is provided with an external threaded portion 33 radially outwardly of the packing chamber 36 and receives a stem cap 34 provided with internal threads 35 for cooperation with the external threads 33 on the valve body. The cap 34 is provided with an internal shoulder 36 for mounting a packing washer 37 which is adapted to co-operate with a radially extending face 38 on the end of the valve body 11 when the stem cap is on the valve body. An auxiliary packing is thus established to guard against failure of the primary packing 30 mounted in the packing chamber 26. Under normal operating conditions, the stem cap 34 covers the end of the valve stem 19 preventing ingress of dust, dirt and other foreign material into the packing 30 and egress of fluid outwardly should the packing 30 fail for any reason. The stem cap 34 also shields the protruding end portion of the stem 19 from the possibility of contact which could impair the operativeness of the valve.

The base 13 of the valve 10 is mounted on a machine such as the compressor 25 (shown fragmentarily) and is provided with an inlet portion 39 which communicates through the base portion 13 with the central chamber 14. An outlet portion 40 includes a line (shown fragmentarily) soldered in a bore in the valve body and in communication with the reduced bore 17 adjacent the valve seat 18. Fluid may freely pass from the inlet 39 to the outlet portion 40 when the valve stem 19 is in the open position shown. Obviously any form of fluid line attachment means may be provided at the inlet and outlet depending on the environment of contemplated use. An upper portion of the valve body 11 is counterbored and tapped to provide an internally threaded portion 42 to accommodate external threads 43 formed on a charging fitting body indicated generally at 41. A central stepped bore 44 is formed in the charging fitting body 41 and has the lower end in communication with the valve chamber 14 through a port 45 formed at the base of the counterbore through the valve body wall 11. The charging fitting body 41 may be provided with external tool pads 46 to facilitate connection of the same to the valve body 11.

The outer end of the charging valve body 41 is provided with an external threaded portion 47 for connection to an external line, supply, gauge or the like. During periods of nonuse, a cap 49 closes off the end of the charging fitting 41 in a fluid tight manner. A charging core 50 is threadably received in the outer end of the central bore 44 in the charging fitting 41 and is normally closed in the absence of an external line being connected to the fitting 41. This will be described more completely in connection with the enlarged cross sectional view of FIG. 4. As illustrated, the charging fitting 41 is a separate component which is threadably joined to the valve body 11, however, it is contemplated that a fitting portion could be formed integral with the valve body 11 at forging if desired.

The manner in which the charging valve 10 is connected to the compressor is best seen in the plan view of FIG. 2 wherein the base portion 13 includes a pair of outwardly projecting lug portions 51 and 52 having stud members 53 and 54 extending therethrough into threaded relationship with the compressor 25. Suitable seal means (not shown) may be interposed between the base portion 13 and the compressor 25 to form a fluid tight joint.

The plan view in FIG. 3 illustrates a modified form of charging valve design. In the modified form illustrated in FIG. 3, the charging valve 55 is provided with a charging fitting portion 56 which extends angularly from the valve body 57. A central bore 58 extends through the charging fitting 56 into communication with a valve chamber 59. This particular configuration utilizes the same components and operates in the same manner as the form illustrated in FIGS. 1 and 2, however provides a charging fitting extending at an angle with respect to the valve body for those applications in which the mechanical geometric restrictions of the environment of use preclude the use of a valve of the type illustrated in FIGS. 1 and 2.

The enlarged cross sectional view of FIG. 4 illustrates a fragmentary portion of the valve body 11 in the area wherein the charging fitting 41 is connected thereto. An outer end portion of the central bore 44 of the charging fitting 41 is provided with an internally threaded portion 60 which co-operates with externally threaded portions 61 on the upper portion of the charging core 50.

A central stem 62 is mounted in the body portion 63 of the charging core 50 and is provided at its lower end with a seat portion 64. Suitable biasing means such as a spring (not shown), is provided within the charging core body 63 to urge the stem 62 upwardly thereby to maintain the seat 64 in sealing engagement with the lower end of the body 63. Pressure acting on an end face portion 65 of the stem assists the biasing means (not shown) to maintain the seat 64 in the closed position absent external forces on the upper end of the stem 62. The charging core 50 is what is commonly referred to in the valve art as a tire valve or valve core, being readily available on the open market and capable of operation under considerable pressure.

The charging fitting cap member 49 is formed with a frusto-conical machine surface 66 formed on the interior which co-operates with a frusto-conical portion 67 machined on the upper end of the charging fitting 41 to form a fluid tight seal when the cap is in the position illustrated. This guards against the possibility of charging core failure in addition to protecting the charging core 50 from the ingress of foreign debris which could impair its operativeness. In normal operating circumstances, the charging fitting cap 49 is positioned as shown. When it becomes desirable to sample, charge, or test the fluid in the closed system, the cap 49 is removed and connection made to an external source in a manner to be described.

Figure 5:
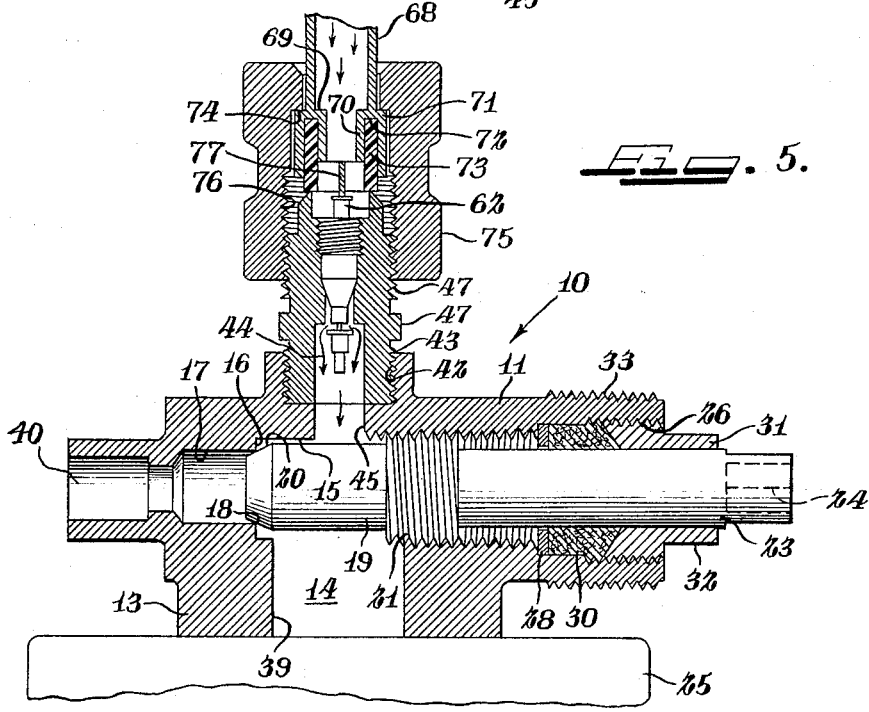
FIG. 5 is a cross sectional view of the charging valve of FIG. 1 with the valve stem in the closed position and a charging line connected to the charging fitting.

The manner in which a charging or sampling line is connected to the charging fitting 41 is best seen in the cross section view of FIG. 5. A metallic end portion 69 is provided on a charging or sampling line 68 and terminates in a pair of concentrically spaced cylindrical end portions 70 and 71 forming an axially opening annular channel 72. An annular plastic insert 73 is mounted in the axially facing channel 72 in a fluid tight manner and projects outwardly of the channel 72 for purposes to become apparent.

The outer cylindrical portion 71 forms a shoulder 74 at the juncture with the charging line 68 to provide a swivel mounting for a fitting nut 75. Suitable internal threads 76 are formed in the fitting nut 75 to co-operate with the external threads 47 on the charging fitting 41 to facilitate joining thereto. As the fitting nut 75 rotates relative to the balance of the charging line 68, the lower end portion of the annular plastic insert 73 is drawn into abutment with the upper end of the charging fitting 41.

A stem operator 77 is attached to the terminal portion of the inner cylindrical portion 70 and extends downwardly into engagement with the top portion of the charging core stem 62. As the fitting nut is drawn up tight, the operator 77 depresses the stem 62 against the upward force generated by the biasing spring, and fluid pressure acting on the lower end of the stem 62. The dimensional relationships between the stem operator 77 fitting nut 75 and annular plastic insert 73 is such that the plastic insert will be in fluid tight engagement with the upper end of the charging fitting 41 before the stem operator 77 depresses the stem 62, thereby placing the external line 68 in communication with the interior chamber 14 of the charging valve 10.

Thus, it can be observed that the closed system may be easily connected to an external charging supply, pressure gauge or sampling system depending upon the desired operation to be performed without operating the main valve stem 19. With the stem 19 in the position shown, the charging line 68 is in direct communication with the compressor and operational pressures can readily be determined with a suitable gauge on the end of the line 68. Additional fluid may be added to the closed system if necessary.

If it is desirable to establish the operating pressures within the closed system, the valve stem 19 may be moved to the open position, as shown in FIG. 1, and the fluid line or charging line 69 connected to the appropriate gauges while the compressor continues in operation. Thus, it can be appreciated that irrespective of the position of the valve 19 access may be readily had to the closed system without the fear or loss of fluid within the system. Upon completion of the charging or sampling operation, the valve stem cap 34 and the charging fitting cap 49 are replaced after removal of the charging line.

The present construction allows sampling, charging and testing to be accomplished on frequent occasions without requiring operation of the valve stem, which as pointed out above is highly undesirable. In addition, the charging valve design is simplified when contrasted with prior art models and accordingly economically manufactured. In one specific embodiment the body portion 11 was formed of forged brass while the valve stem was formed of steel thereby providing a stem which was harder than the co-operating seat formed within the valve body. This provided excellent seating after the stem was cycled into engagement with valve seat a few times. The charging fitting may be formed of brass, or the equivalent with the caps being high impact plastic, brass or the like depending on the application. These materials are exemplary of those which could be used in a given application. Obviously other materials having the requisite strength and corrosion resistant properties may be substituted.

Although the present construction has been shown in connection with two embodiments it will become immediately obvious to those skilled in the art that numerous departures can be made without departing from the novel concepts embodied herein. Therefore, it is intended that any limitations imposed be within the spirit and scope of the appended claims.

I claim:

1. In a closed fluid handling system, a charging and sampling valve adapted to control flow between parts of said system, said charging and sampling valve comprising a body portion, a chamber formed within said body portion, inlet and outlet ports communicating with said chamber, means adjacent each of said inlet and outlet portions to permit mounting of said valve within said fluid handling system, a valve stem being threadably mounted within said body portion, first seat means formed on an end portion of said valve stem, said first seat means adapted to co-operate with a second seat means formed in an end wall portion of said chamber at said outlet portion, said seat means being in the direct path of flow between said inlet and outlet ports and adapted to control flow therebetween, sealing means surrounding a portion of said stem as it emerges from said body portion, a charging fitting on said valve body, a central bore in said charging fitting communicating with said chamber, a charging core within said central bore adapted to control flow therethrough, stem means on said charging core adapted to be engaged by a stem operator means carried on a charging line, said stem operator means being adapted to open said charging core when said charging line is fluid-tightly connected to said charging fitting whereby said chamber is placed in communication with a system externally of said closed fluid system thereby to permit charging and sampling regardless of the position of said valve stem.

2. The fluid handling system of claim 1 wherein thread means is provided on said body portion concentrically of said valve stem, and cap means is threadedly received on said threaded portion, said cap means covering said valve stem as it emerges from said body, and seal means interposed between a portion of said cap means and said valve body to form an auxiliary seal.

3. A valve particularly adapted for use in closed fluid systems wherein occasional access to the system is desired for sampling and charging, said valve including a body portion, a series of stepped bores within said body portion forming a chamber, inlet and outlet means communicating with said chamber, an end wall in said chamber between said inlet and outlet means forming a valve seat, an axially movable valve stem having a first portion thereof received in said chamber and a second projecting from said body portion, seal means sealing said valve stem to said body portion, said first portion on said valve stem having a seating portion adapted to co-operate with said valve seat in said end wall around said outlet means thereby controlling flow between said inlet and outlet means, a charging fitting on said body portion, a central bore in said charging fitting having one end in communication with said chamber, a charging core closing off one end of said central bore in said charging fitting, stem means on said charging core centrally of said bore and terminating adjacent an upper end thereof, means on said charging fitting for removably connecting a charging line thereto, a charging line connected to said charging fitting, means on said charging line for sealing said charging line to said charging fitting and stem operator means carried by said charging line in engagement with said stem in said charging core, said stem operator means opening said charging core to place said charging line in communication with said chamber and said system irrespective of the position of said valve.

References Cited by the Examiner

UNITED STATES PATENTS

| | | | |
|---|---|---|---|
| 1,615,439 | 1/1927 | Cooper | 137—232 X |
| 1,742,107 | 12/1929 | Stubblefield | 137—232 |
| 3,170,495 | 2/1965 | Wagner | 137—317 X |

WILLIAM F. O'DEA, *Primary Examiner.*

ISADOR WEIL, *Examiner.*

D. H. LAMBERT, *Assistant Examiner.*